US009498718B2

(12) United States Patent
Latta et al.

(10) Patent No.: US 9,498,718 B2
(45) Date of Patent: Nov. 22, 2016

(54) ALTERING A VIEW PERSPECTIVE WITHIN A DISPLAY ENVIRONMENT

(75) Inventors: Stephen G. Latta, Seattle, WA (US); Gregory N. Snook, Sammamish, WA (US); Justin McBride, Renton, WA (US); Arthur Charles Tomlin, Redmond, WA (US); Peter Sarrett, Redmond, WA (US); Kevin Geisner, Seattle, WA (US); Relja Markovic, Seattle, WA (US); Christopher Vuchetich, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 345 days.

(21) Appl. No.: 12/474,769

(22) Filed: May 29, 2009

(65) Prior Publication Data

US 2010/0281438 A1 Nov. 4, 2010

Related U.S. Application Data

(60) Provisional application No. 61/174,893, filed on May 1, 2009.

(51) Int. Cl.
*G06F 3/033* (2013.01)
*A63F 13/5255* (2014.01)
*A63F 13/213* (2014.01)
*A63F 13/42* (2014.01)
*G06F 3/01* (2006.01)

(52) U.S. Cl.
CPC ......... *A63F 13/5255* (2014.09); *A63F 13/213* (2014.09); *A63F 13/42* (2014.09); *G06F 3/011* (2013.01); *G06F 3/017* (2013.01); *A63F 2300/1093* (2013.01); *A63F 2300/6045* (2013.01); *A63F 2300/6676* (2013.01)

(58) Field of Classification Search
CPC .. G06F 3/04883; G06F 3/017; G06F 3/0481; G06F 3/0488; G06F 2203/04807; G06F 3/011; A63F 13/5255; A63F 13/213; A63F 13/42; A63F 2300/1093; A63F 2300/6045; A63F 2300/6676

USPC ........................................................ 715/863
See application file for complete search history.

(56) References Cited

U.S. PATENT DOCUMENTS 4,627,620 A  12/1986 Yang
4,630,910 A  12/1986 Ross et al.
(Continued)

FOREIGN PATENT DOCUMENTS

CN  1797284 A  7/2006
CN  20125344 B  6/2010
(Continued)

OTHER PUBLICATIONS

Ahn, Sang Chul et al.; Large Display Interaction using Video Avatar and Hand Gesture Recognition; Imaging Media Research Center, Seoul, Korea; 8 pages http://www.imrc.kist.re.kr/~kij/LNCS_2004.pdf.
(Continued)

*Primary Examiner* — Jung-Mu Chuang
(74) *Attorney, Agent, or Firm* — Gregg Wisdom; Judy Yee; Micky Minhas

(57) ABSTRACT

Disclosed herein are systems and methods for altering a view perspective within a display environment. For example, gesture data corresponding to a plurality of inputs may be stored. The input may be input into a game or application implemented by a computing device. Images of a user of the game or application may be captured. For example, a suitable capture device may capture several images of the user over a period of time. The images may be analyzed and processed for detecting a user's gesture. Aspects of the user's gesture may be compared to the stored gesture data for determining an intended gesture input for the user. The comparison may be part of an analysis for determining inputs corresponding to the gesture data, where one or more of the inputs are input into the game or application and cause a view perspective within the display environment to be altered.

18 Claims, 8 Drawing Sheets

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,720,789 A * | 1/1988 | Hector et al. | 463/33 |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,139,261 A * | 8/1992 | Openiano | 463/36 |
| 5,148,154 A | 9/1992 | MacKay et al. | |
| 5,184,295 A | 2/1993 | Mann | |
| 5,229,754 A | 7/1993 | Aoki et al. | |
| 5,229,756 A * | 7/1993 | Kosugi et al. | 345/156 |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A * | 12/1996 | Jacobsen | A63B 22/0664 434/11 |
| 5,594,469 A | 1/1997 | Freeman et al. | |
| 5,597,309 A | 1/1997 | Riess | |
| 5,616,078 A * | 4/1997 | Oh | A63F 13/06 345/156 |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A * | 6/1999 | Ahdoot | A63F 13/06 345/156 |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,057,909 A | 5/2000 | Yahav et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,088,042 A * | 7/2000 | Handelman | G06T 13/40 345/473 |
| 6,098,458 A | 8/2000 | French et al. | |
| 6,100,517 A | 8/2000 | Yahav et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,322,074 B1 * | 11/2001 | Forrest et al. | 273/272 |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,450,886 B1 * | 9/2002 | Oishi | G06F 3/023 200/61.1 |
| 6,476,834 B1 | 11/2002 | Doval et al. | |
| 6,496,598 B1 | 12/2002 | Harman | |
| 6,498,628 B2 | 12/2002 | Iwamura | |
| 6,502,515 B2 | 1/2003 | Burckhardt et al. | |
| 6,503,195 B1 | 1/2003 | Keller et al. | |
| 6,512,838 B1 | 1/2003 | Rafii et al. | |
| 6,539,931 B2 | 4/2003 | Trajkovic et al. | |
| 6,554,434 B2 * | 4/2003 | Sciammarella et al. | 353/98 |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,771,277 B2 | 8/2004 | Ohba | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,006,236 B2 | 2/2006 | Tomasi et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,177 B2 | 5/2006 | Tomasi et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,151,530 B2 | 12/2006 | Roeber et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,224,384 B1 | 5/2007 | Iddan et al. | |
| 7,227,526 B2 * | 6/2007 | Hildreth | G06T 19/006 345/156 |
| 7,259,747 B2 | 8/2007 | Bell | |
| 7,293,235 B1 * | 11/2007 | Powers | G06T 7/20 463/1 |
| 7,293,356 B2 | 11/2007 | Sohn et al. | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |

(56) References Cited

U.S. PATENT DOCUMENTS

| | | | |
|---|---|---|---|
| 7,348,963 B2 | 3/2008 | Bell | |
| 7,359,121 B2 | 4/2008 | French et al. | |
| 7,367,887 B2 * | 5/2008 | Watabe | A63F 13/10 463/36 |
| 7,379,563 B2 | 5/2008 | Shamaie | |
| 7,379,566 B2 | 5/2008 | Hildreth | |
| 7,386,799 B1 | 6/2008 | Clanton et al. | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,528,835 B2 * | 5/2009 | Templeman | A63F 13/00 345/474 |
| 7,536,032 B2 | 5/2009 | Bell | |
| 7,542,040 B2 * | 6/2009 | Templeman | G06F 3/011 345/474 |
| 7,555,142 B2 | 6/2009 | Hildreth et al. | |
| 7,560,701 B2 | 7/2009 | Oggier et al. | |
| 7,562,459 B2 * | 7/2009 | Fourquin | G06F 3/0346 33/366.11 |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,665,041 B2 * | 2/2010 | Wilson | G06F 3/017 715/860 |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 * | 4/2010 | Hillis et al. | 345/156 |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,515 B2 * | 6/2010 | Mandella | G06F 3/0325 345/166 |
| 7,729,530 B2 | 6/2010 | Antonov et al. | |
| 7,746,345 B2 | 6/2010 | Hunter | |
| 7,755,608 B2 * | 7/2010 | Chang | G06F 3/017 345/157 |
| 7,760,182 B2 | 7/2010 | Ahmad et al. | |
| 7,809,167 B2 | 10/2010 | Bell | |
| 7,815,508 B2 * | 10/2010 | Dohta | A63F 13/10 463/37 |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,009,022 B2 * | 8/2011 | Kipman et al. | 340/407.1 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,083,588 B2 * | 12/2011 | Pryor | 463/31 |
| 8,194,921 B2 * | 6/2012 | Kongqiao et al. | 382/103 |
| 8,241,125 B2 * | 8/2012 | Hughes | G06F 3/04815 463/36 |
| 8,274,535 B2 * | 9/2012 | Hildreth et al. | 345/676 |
| 8,277,316 B2 * | 10/2012 | Haigh-Hutchinson | 463/31 |
| 8,419,545 B2 * | 4/2013 | Yen | A63F 13/06 463/42 |
| 8,503,086 B2 * | 8/2013 | French | A63B 24/0003 359/629 |
| 8,571,698 B2 * | 10/2013 | Chen et al. | 700/135 |
| 8,605,990 B2 * | 12/2013 | Izumi | 382/154 |
| 8,797,260 B2 * | 8/2014 | Mao | A63F 13/06 345/156 |
| 8,929,612 B2 * | 1/2015 | Ambrus | G06K 9/00362 382/115 |
| 2002/0041327 A1 * | 4/2002 | Hildreth | G06F 3/011 348/42 |
| 2003/0138130 A1 * | 7/2003 | Cohen | G06T 7/2033 382/103 |
| 2004/0189720 A1 * | 9/2004 | Wilson | G06K 9/00355 715/863 |
| 2004/0193413 A1 * | 9/2004 | Wilson | G06F 3/017 704/243 |
| 2004/0207597 A1 | 10/2004 | Marks | |
| 2005/0059488 A1 | 3/2005 | Larsen et al. | |
| 2005/0166163 A1 * | 7/2005 | Chang | G06F 3/017 715/863 |
| 2006/0142081 A1 * | 6/2006 | Kil | 463/36 |
| 2006/0188144 A1 | 8/2006 | Sasaki et al. | |
| 2006/0239558 A1 | 10/2006 | Rafii et al. | |
| 2007/0003915 A1 * | 1/2007 | Templeman | G06T 13/40 434/247 |
| 2007/0013718 A1 | 1/2007 | Ohba | |
| 2007/0060336 A1 | 3/2007 | Marks et al. | |
| 2007/0070072 A1 * | 3/2007 | Templeman | A63F 13/00 345/473 |
| 2007/0098222 A1 | 5/2007 | Porter et al. | |
| 2007/0180718 A1 * | 8/2007 | Fourquin | G06F 3/0346 33/366.11 |
| 2007/0211239 A1 * | 9/2007 | Mandella | G06F 3/0325 356/138 |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0013793 A1 * | 1/2008 | Hillis et al. | 382/114 |
| 2008/0018595 A1 * | 1/2008 | Hildreth et al. | 345/156 |
| 2008/0026838 A1 | 1/2008 | Dunstan et al. | |
| 2008/0062257 A1 | 3/2008 | Corson | |
| 2008/0100620 A1 | 5/2008 | Nagai et al. | |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0170123 A1 * | 7/2008 | Albertson | A63B 24/0003 348/157 |
| 2008/0191864 A1 * | 8/2008 | Wolfson | G06F 3/011 340/524 |
| 2008/0215972 A1 | 9/2008 | Zalewski et al. | |
| 2008/0215973 A1 | 9/2008 | Zalewski et al. | |
| 2008/0215974 A1 * | 9/2008 | Harrison | A63F 13/10 715/706 |
| 2008/0244468 A1 * | 10/2008 | Nishihara et al. | 715/863 |
| 2008/0309618 A1 * | 12/2008 | Okada | G06F 3/04883 345/173 |
| 2009/0002333 A1 * | 1/2009 | Maxwell | G06F 3/04883 345/173 |
| 2009/0077504 A1 * | 3/2009 | Bell | G06F 3/011 715/863 |
| 2009/0098939 A1 * | 4/2009 | Hamilton, II | A63F 13/12 463/42 |
| 2009/0141933 A1 | 6/2009 | Wagg | |
| 2009/0143124 A1 * | 6/2009 | Hughes | A63F 13/10 463/2 |
| 2009/0167679 A1 | 7/2009 | Klier et al. | |
| 2009/0217211 A1 * | 8/2009 | Hildreth et al. | 715/863 |
| 2009/0221368 A1 * | 9/2009 | Yen | A63F 13/10 463/32 |
| 2009/0221372 A1 * | 9/2009 | Casey | A63F 13/06 463/36 |
| 2009/0221374 A1 * | 9/2009 | Yen | A63F 13/06 463/42 |
| 2009/0244309 A1 * | 10/2009 | Maison et al. | 348/222.1 |
| 2009/0278820 A1 * | 11/2009 | Fourquin | G06F 3/0346 345/184 |
| 2009/0318224 A1 * | 12/2009 | Ealey | A63F 13/005 463/31 |
| 2010/0050133 A1 * | 2/2010 | Nishihara et al. | 715/863 |

(56) References Cited

U.S. PATENT DOCUMENTS

| | | | |
|---|---|---|---|
| 2010/0060722 A1* | 3/2010 | Bell | G06F 3/017 348/51 |
| 2010/0295779 A1* | 11/2010 | Pearce et al. | 345/157 |
| 2011/0080490 A1* | 4/2011 | Clarkson et al. | 348/222.1 |
| 2011/0172927 A1* | 7/2011 | Sahasrabudhe | A61B 5/0476 702/19 |
| 2011/0193939 A1* | 8/2011 | Vassigh | G06F 3/011 348/46 |

FOREIGN PATENT DOCUMENTS

| | | |
|---|---|---|
| EP | 0583061 A2 | 2/1994 |
| EP | 1621977 A2 | 2/2006 |
| EP | 1879130 A2 | 1/2008 |
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO2008014826 A1 | 2/2008 |
| WO | WO 2009/059065 A1 | 5/2009 |

OTHER PUBLICATIONS

Lee, ChanSu et al.; The Control of Avatar Motion Using Hand Gesture for Immersive Virtual Environment; VR Lab, Human-Computer Interface Dept. SERI; 8 pages http://vr.kaist.ac.kr/publication/techmemo/tm99-3.doc.

Kaiser, Ed et al.; Mutual Disambiguation of 3D Multimodal Interaction in Augmented and Virtual Reality; 8 pages http://research.microsoft.com/en-us/um/people/benko/publications/2003/p128-kaiser.pdf.

PCT Application No. PCT/US2010/032447: International Search Report and Written Opinion of the International Searching Authority, Dec. 7, 2010, 8 pages.

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

GestureTek, "Custom 3D Depth Sensing Prototype System for Gesture Control," http://www.gesturetek.com/3ddepth/introduction.php, printed Apr. 6, 2009, 2 pages.

Tollmar, K. et al., "Gesture + Play Exploring Full-Body Navigation for Virtual Environments," Conference on Computer Vision and Pattern Recognition Workshop, Jun. 16-22, 2003, 8 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

ALTERING A VIEW PERSPECTIVE WITHIN A DISPLAY ENVIRONMENT

CROSS REFERENCE TO RELATED APPLICATION

The present application claims priority to U.S. Provisional Application No. 61/174,893, titled "Altering a View Perspective within a Display Environment" filed May 1, 2009, the contents of which are incorporated herein in its entirety.

BACKGROUND

Many computing applications such as computer games, multimedia applications, or the like use controls to allow users to manipulate game characters or other aspects of an application. Typically, such controls are input using, for example, controllers, remotes, keyboards, mice, or the like. Unfortunately, such controls can be difficult to learn, thus creating a barrier between a user and such games and applications. Furthermore, the user actions required for operating such controls may be different than the actions that a user may take to realistically interact with virtual or real environments displayed in a game or other application.

For example, buttons of a handheld controller may be used to cause a game character or an avatar to navigate or to change perspectives in a three-dimensional (3D) virtual environment. In this example, the use of buttons on the handheld controller to interact with the virtual environment is physically different than the realistic movements a person may preferably normally use to interact with a like real environment. For example, rather than pushing a controller button to move a game character forward in a virtual environment, it may be preferable for a user to make a walking motion to effect forward movement of the game character in the virtual environment.

Accordingly, it is desirable to provide systems and methods for allowing a user to interact within a display environment by use of intuitive, natural movements or gestures.

SUMMARY

Disclosed herein are systems and methods for altering a view perspective within a display environment. For example, gesture data corresponding to a plurality of inputs may be stored. The input may be input into a game or application implemented by a computing device. Images of a user of the game or application may be captured. For example, a suitable capture device may capture several images of the user over a period of time. The images may be analyzed and/or processed for detecting a user's gesture. One or more aspects of the user's gesture may be compared to one or more aspects of the stored gesture data for determining an intended gesture input for the user. The comparison may be part of an analysis for determining one or more of the inputs corresponding to the gesture data, where one or more of the inputs are input into the game or application and cause a view perspective within the display environment to be altered. The altered view perspective of the display environment may be displayed.

In one embodiment, the user's gestures or movements may be used for controlling actions of an avatar or game character. For example, the user's gestures may be compared against gesture filters. If the movements of the points meet speed and/or position filtering criteria, the movements may be mapped directly onto a corresponding point of the user's avatar. The movements may be scaled so that the movements are correct regardless of the difference in proportion between the user's skeletal model and the avatar model.

The gesture filters may allow filtering conditions to be specified on a per-bone and/or per-joint basis. Conditions may be expressed in terms of angular or linear distance from other bones and/or joints, a neutral "rest" position, or fixed positions in a play space or room. Conditions may also be expressed in terms of velocity or acceleration. If a user movement or motion meets the criteria of the filter, the system may reflect the movement in the avatar and/or reflect the movement in a first-person game character's view perspective shown on a display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for altering a view perspective within a virtual environment in accordance with this specification are further described with reference to the accompanying drawings in which.

DETAILED DESCRIPTION OF ILLUSTRATIVE EMBODIMENTS

Figure 1:
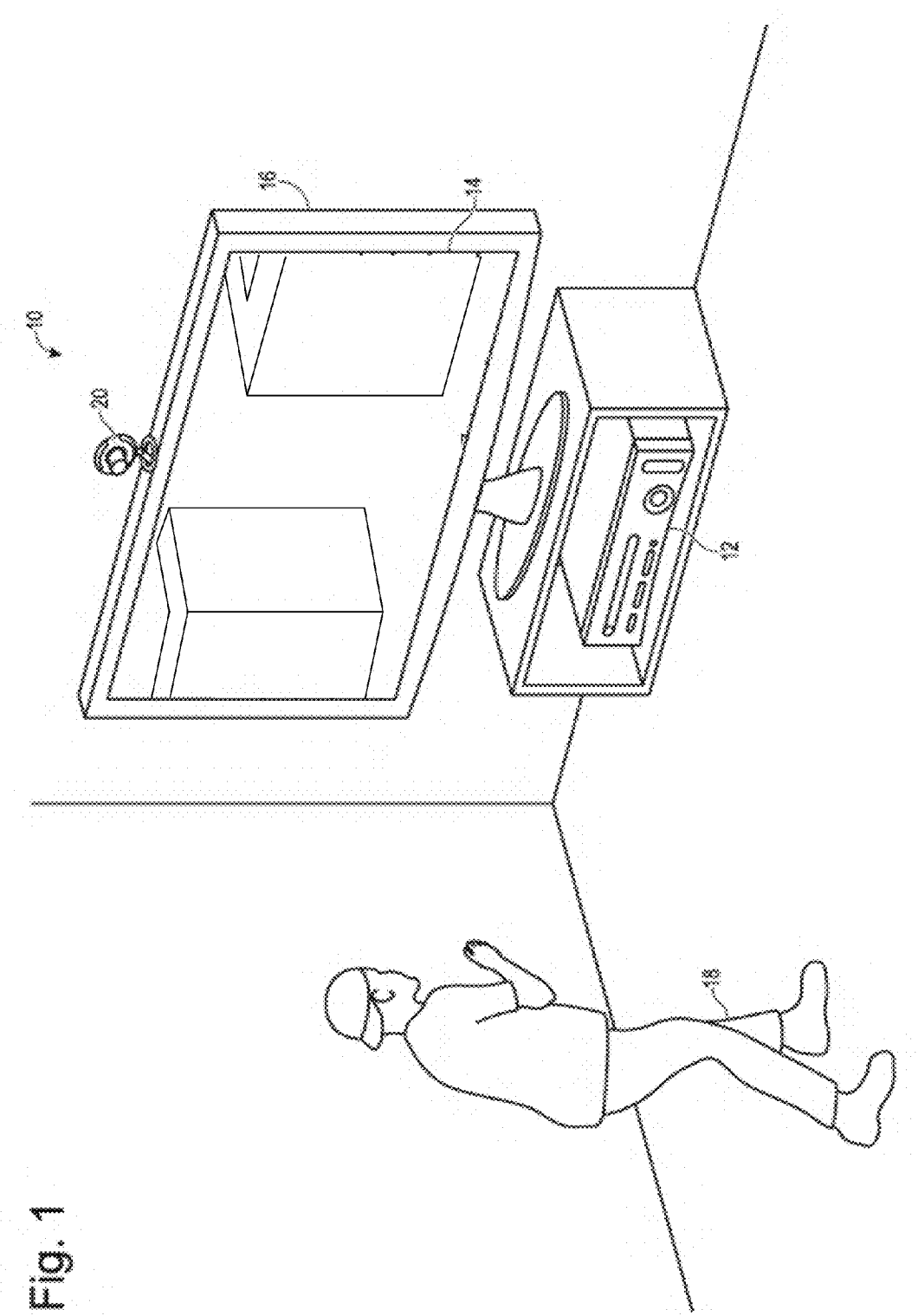
FIG. 1 illustrates an example embodiment of a target recognition, analysis, and tracking system with a user playing a game having a maze.

As will be described herein, a user may alter a view perspective within a display environment by making one or more gestures. According to one embodiment, the user may make one or more physical movements or gestures that change a displayed perspective within a 3D virtual environment. For example, the user may be represented by an avatar or game character in the virtual environment, and a shoulder turn movement by the user to the left or right may cause a corresponding shift of a view of the virtual environment. In another embodiment, a display environment may be a real environment captured by video equipment, and movement by a user may cause corresponding "movement" of the user's avatar or game character such that a displayed perspective is correspondingly altered in the displayed real environment.

In an embodiment, user gestures may be detected by, for example, a capture device. For example, the capture device may capture a depth image of a scene. In one embodiment, the capture device may determine whether one or more targets or objects in the scene correspond to a human target such as the user. If the capture device determines that one or more objects in the scene is a human, it may determine the depth to the human as well as the size of the person. The device may then center a virtual screen around each human target based on stored information, such as, for example a look up table that matches size of the person to wingspan and/or personal profile information. Each target or object that matches the human pattern may be scanned to generate a model such as a skeletal model, a mesh human model, or the like associated therewith. The model may then be provided to the computing environment such that the computing environment may track the model, render an avatar associated with the model, determine clothing, skin and other colors based on a corresponding RGB image, and/or determine which controls to perform in an application executing on the computer environment based on, for example, the model.

In an example embodiment of showing an avatar, typically the avatar may be shown from a third-person view perspective of over-the-shoulder of the avatar. The view perspective may stay from a position behind the avatar, such as a user feels like the on-screen avatar is mimicking the user's actions. This view perspective may remove any ambiguity, from the user's perspective, between right and left, meaning the user's right is the avatar's right, and the player's left is the avatar's left.

In an example embodiment, the system may monitor registration points on a user's skeletal model for tracking user movement. When the points move, the system may compare the motion against gesture filters. If the movements of the points meet speed and/or position filtering criteria, the movements may be mapped directly onto a corresponding point of the user's avatar. The movements may be scaled so that the movements are correct regardless of the difference in proportion between the user's skeletal model and the avatar model.

The gesture filters may allow filtering conditions to be specified on a per-bone and/or per-joint basis. Conditions may be expressed in terms of angular or linear distance from other bones and/or joints, a neutral "rest" position, or fixed positions in a play space or room. Conditions may also be expressed in terms of velocity or acceleration. If a user movement or motion meets the criteria of the filter, the system may reflect the movement in the avatar and/or reflect the movement in a first-person game character's view perspective shown on a display.

In an example, a first time a gesture filter recognizes a user gesture after any number of rejections, the system may begin a transition process whereby an avatar's limbs are smoothly animated into a position that matches the user. During this transition, additional gesture input actions may be recognized, causing the target location of the animation and/or the view perspective to change. The animation may be dynamically updated to target the user's new position. The retargeting may continue until the avatar's position matches that of the user. If the gesture filter rejects actions as being outside of its parameters while a transition is still in progress, the transition may continue to the last-known gesture target unless overridden by another gesture animation.

User movements may be tracked over a period of time for determining whether movements by the user were intended as input gestures for interacting with a display environment. For example, the tracked movements may be used along with gesture models for determining whether the user intended to alter a view perspective within an environment. In an example embodiment, a computing environment may store gesture data including gesture models for defining movements corresponding to input gestures. For example, a gesture model can define a forward movement, a backward movement, a turn movement, a duck movement, a crouch movement, a swim movement, a flying movement, a zoom movement, a strafe movement, or a circle movement. When a user makes a movement, the movement can be analyzed using the gesture models for determining whether the user intended to make the defined gesture. Based on the analysis, the computing environment may determine that one or more aspects of the movement are a sufficiently similar to one or more aspects of a defined gesture such that it may be determined that the gesture is detected. If it is determined that a user's movements are sufficiently similar to one of the gesture models, the input corresponding to the gesture model may be used as an input into a game or application for altering a view perspective within an environment, and/or for controlling an avatar or game character.

FIG. 1 illustrates an example embodiment of a configuration of a target recognition, analysis, and tracking system 10 with user 18 playing a game having a maze. In the example embodiment, the system 10 may recognize, analyze, and track movements of a human target for determining an intended gesture of the user 18. Further, the system 10 may analyze the user's movements using a gesture database including gesture models, and may alter a view perspective within a display 14 of an audiovisual device 16 based on a detected gesture made by user 18.

As shown in FIG. 1, the system 10 may include a computing environment 12. The computing environment 12 may be a computer, a gaming system, console, or the like. According to an example embodiment, the computing environment 12 may include hardware components and/or software components such that the computing environment 12 may be used to execute applications such as gaming applications, non-gaming applications, and the like.

As shown in FIG. 1, the system 10 may include a capture device 20. The capture device 20 may be, for example, a detector that may be used to monitor one or more users, such as user 18, such that movements performed by the one or more users may be captured, analyzed, and tracked for determining an intended gesture. The movements may be analyzed using gesture models to perform one or more controls or actions within an application, as will be described in more detail below.

According to one embodiment, the system 10 may be connected to the audiovisual device 16. The audiovisual device 16 may be any type of display, such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIG. 1, in an example embodiment, the application executing on the computing environment 12 may be a game involving a maze that the user 18 may be navigating. For example, the computing environment 12 may use the audiovisual device 16 to provide a view perspective of the user 18 playing as a first-person character within a 3D maze on a display screen of audiovisual device 16. The user 18 may use gestures to control movement within the maze game space, and to alter view perspectives within the 3D maze. For example, the user 18 may move in a walking motion to cause the view perspective to move forward within the maze game space. In another example, the user 18 may turn his or her head or shoulders to move the view perspective in the direction of the turn. Thus, according to an example embodiment, the computing environment 12 and the capture device 20 of the system 10 may be used to recognize and analyze the gesture of the user 18 in physical space such that the gesture may be interpreted as a game control of the player in game space. Other gestures by the user 18 may also be interpreted as other inputs, such as inputs to move backward, turn right or left, duck, crouch, swim, fly, zoom, strafe, circle, and the like. A view perspective in display environment may change in accordance with the gesture.

According to other embodiment, the system 10 may further be used to interpret target movements as operating system and/or application controls that are outside the realm of games. For example, virtually any controllable aspect of an operating system and/or application may be controlled by movements of the target such as the user 18.

Figure 2:
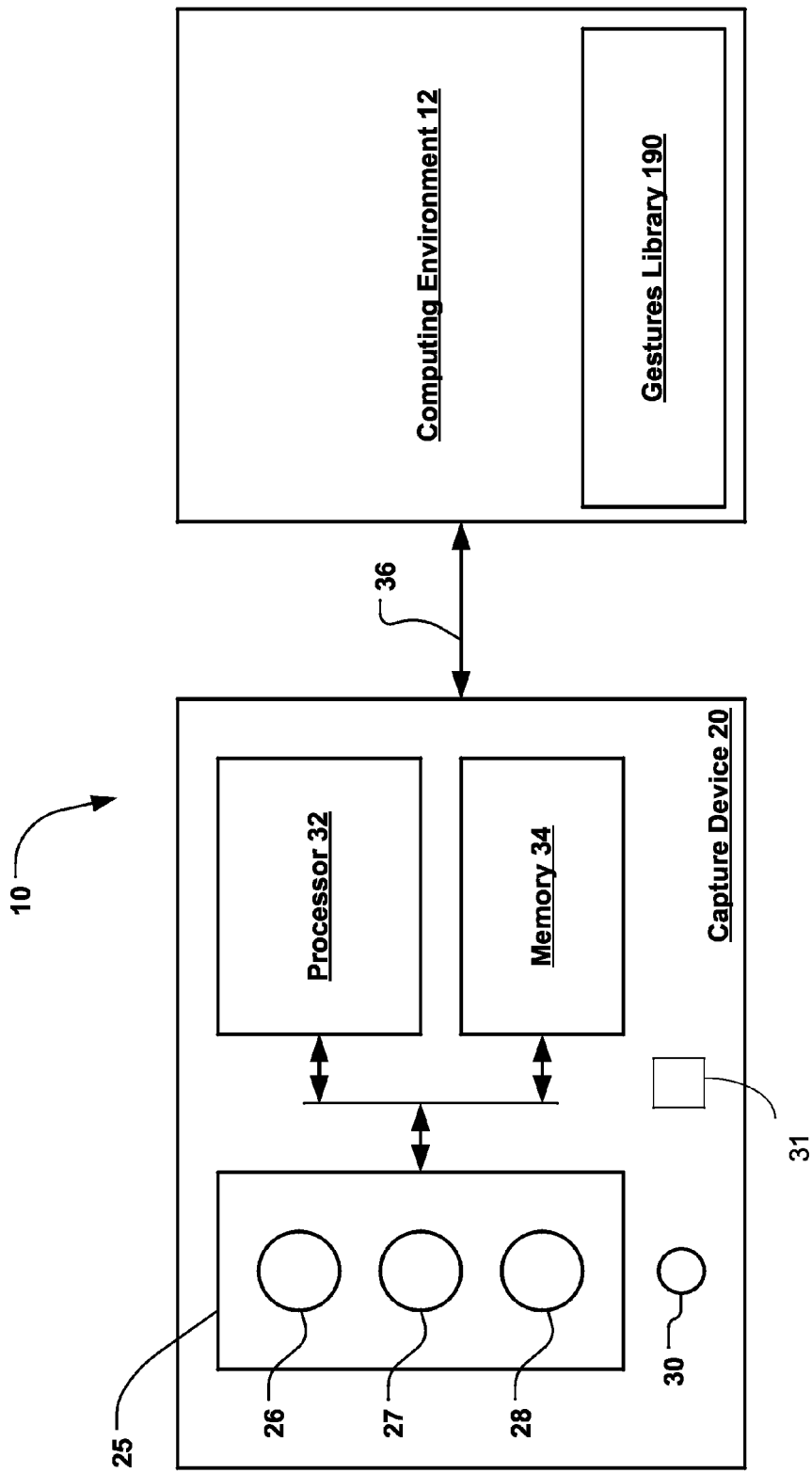
FIG. 2 illustrates an example embodiment of a capture device that may be used in a target recognition, analysis, and tracking system.

FIG. 2 illustrates an example embodiment of the capture device 20 that may be used in the system 10. According to the example embodiment, the capture device 20 may be configured to capture video with user movement information including one or more images that may include gesture values via any suitable technique including, for example, time-of-flight, structured light, stereo image, or the like. According to one embodiment, the capture device 20 may organize the calculated gesture information into coordinate information, such as X-, Y-, and Z-coordinate information. The coordinates of a user model, as described herein, may be monitored over time to determine a movement of the user or the user's appendages. Based on the movement of the user model coordinates, the computing environment may determine whether the user is making a defined gesture, as described herein.

As shown in FIG. 2, according to an example embodiment, the image camera component 25 may include an IR light component 26, a three-dimensional (3-D) camera 27, and an RGB camera 28 that may be used to capture a gesture image(s) of a scene. For example, in time-of-flight analysis, the IR light component 26 of the capture device 20 may emit an infrared light onto the scene and may then use sensors (not shown) to detect the backscattered light from the surface of one or more targets and objects in the scene using, for example, the 3-D camera 27 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects. This information may also be used to determine user movement.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging. This information may also be used to determine user movement.

In another example embodiment, the capture device 20 may use a structured light to capture gesture information. In such an analysis, patterned light (i.e., light displayed as a known pattern such as grid pattern or a stripe pattern) may be projected onto the scene via, for example, the IR light component 26. Upon striking the surface of one or more targets or objects in the scene, the pattern may become deformed in response. Such a deformation of the pattern may be captured by, for example, the 3-D camera 27 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate gesture information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 25. The processor 32 may include a standardized processor, a specialized processor, a microprocessor, or the like that may execute instructions that may include instructions for receiving the gesture-related images, determining whether a suitable target may be included in the gesture image(s), converting the suitable target into a skeletal representation or model of the target, determine arm length or size by any means, including a skeletal tracking system or any other suitable instruction.

The capture device 20 may further include a memory component 34 that may store the instructions that may be executed by the processor 32, images or frames of images captured by the 3-D camera or RGB camera, player profiles or any other suitable information, images, or the like. According to an example embodiment, the memory component 34 may include random access memory (RAM), read only memory (ROM), cache, flash memory, a hard disk, or any other suitable storage component. As shown in FIG. 2, in one embodiment, the memory component 34 may be a separate component in communication with the image capture component 25 and the processor 32. According to another embodiment, the memory component 34 may be integrated into the processor 32 and/or the image capture component 25.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the gesture information and images captured by, for example, the 3-D camera 27 and/or the RGB camera 28, and a skeletal model that may be generated by the capture device 20 to the computing environment 12 via the communication link 36. The computing environment 12 may then use the skeletal model, gesture information, and captured images to, for example, create a virtual screen, adapt the user interface and control an application such as a game or word processor. For example, as shown, in FIG. 2, the computing environment 12 may include a gestures library 190 for storing gesture data. The gesture data may include a collection of gesture filters, each comprising information concerning a gesture that may be performed by the skeletal model (as the user moves). The data captured by the cameras 27, 28 and device 20 in the form of the skeletal model and movements associated with it may be compared to the gesture filters in the gesture library 190 to identify when a user (as represented by the skeletal model) has performed one or more gestures. Those gestures may be associated with various inputs into an application or controls of an application, as described herein. Thus, the computing environment 12 may use the gestures library 190 to interpret movements of the skeletal model and to alter a view perspective based on the movements.

Figure 3:
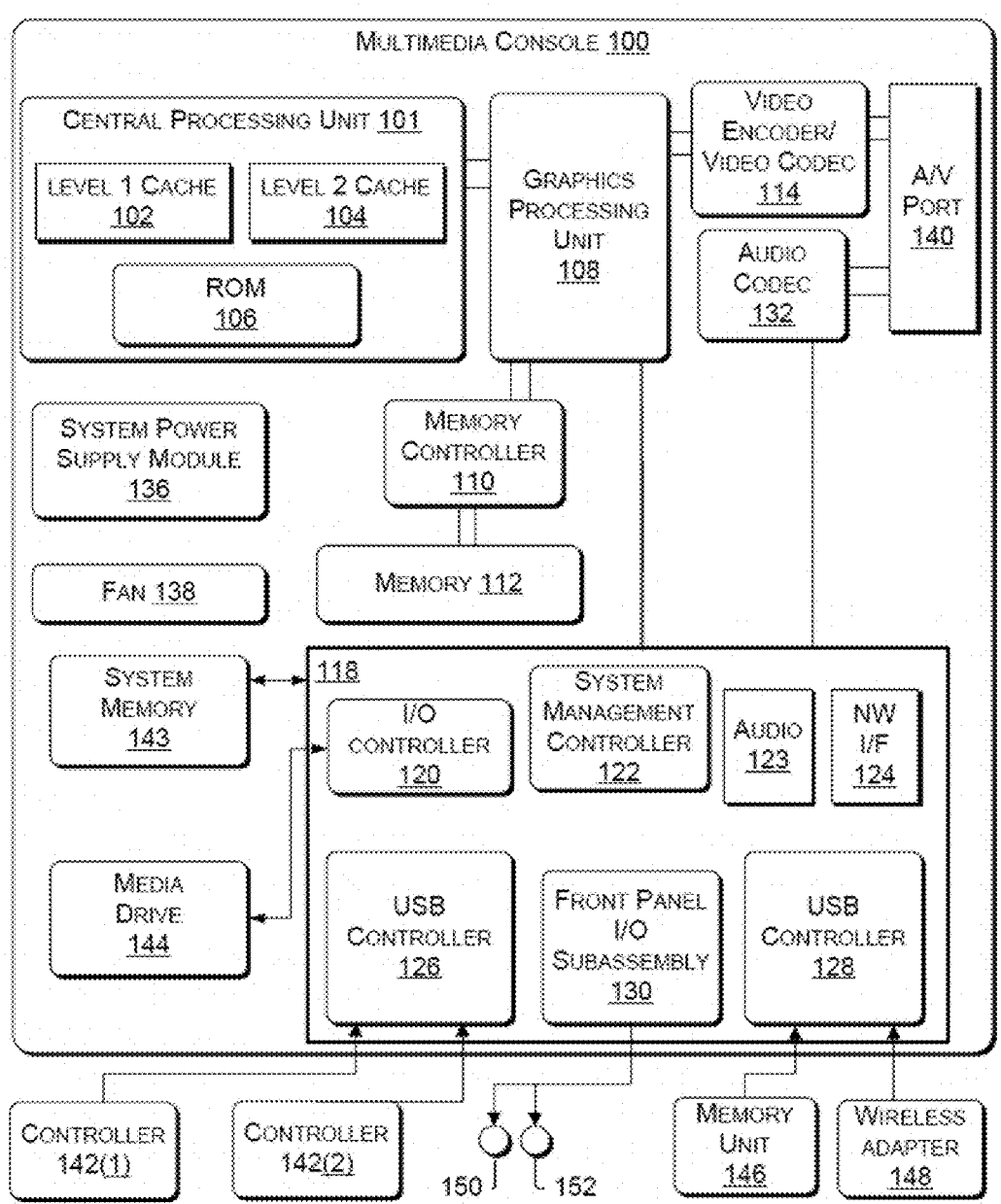
FIG. 3 illustrates an example embodiment of a computing environment that may be used to detect one or more gestures in a target recognition, analysis, and tracking system.

FIG. 3 illustrates an example embodiment of a computing environment that may be used to detect one or more gestures in a target recognition, analysis, and tracking system. Further, the exemplary computing environment may be used for altering a view perspective on an audiovisual device such as, for example, audiovisual device 16 shown in FIG. 1, based on one or more detected gestures. The computing environment such as the computing environment 12 described above with respect to FIGS. 1 and 2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 27, 28 and capture device 20 may define additional input devices for the console 100.

Figure 4:
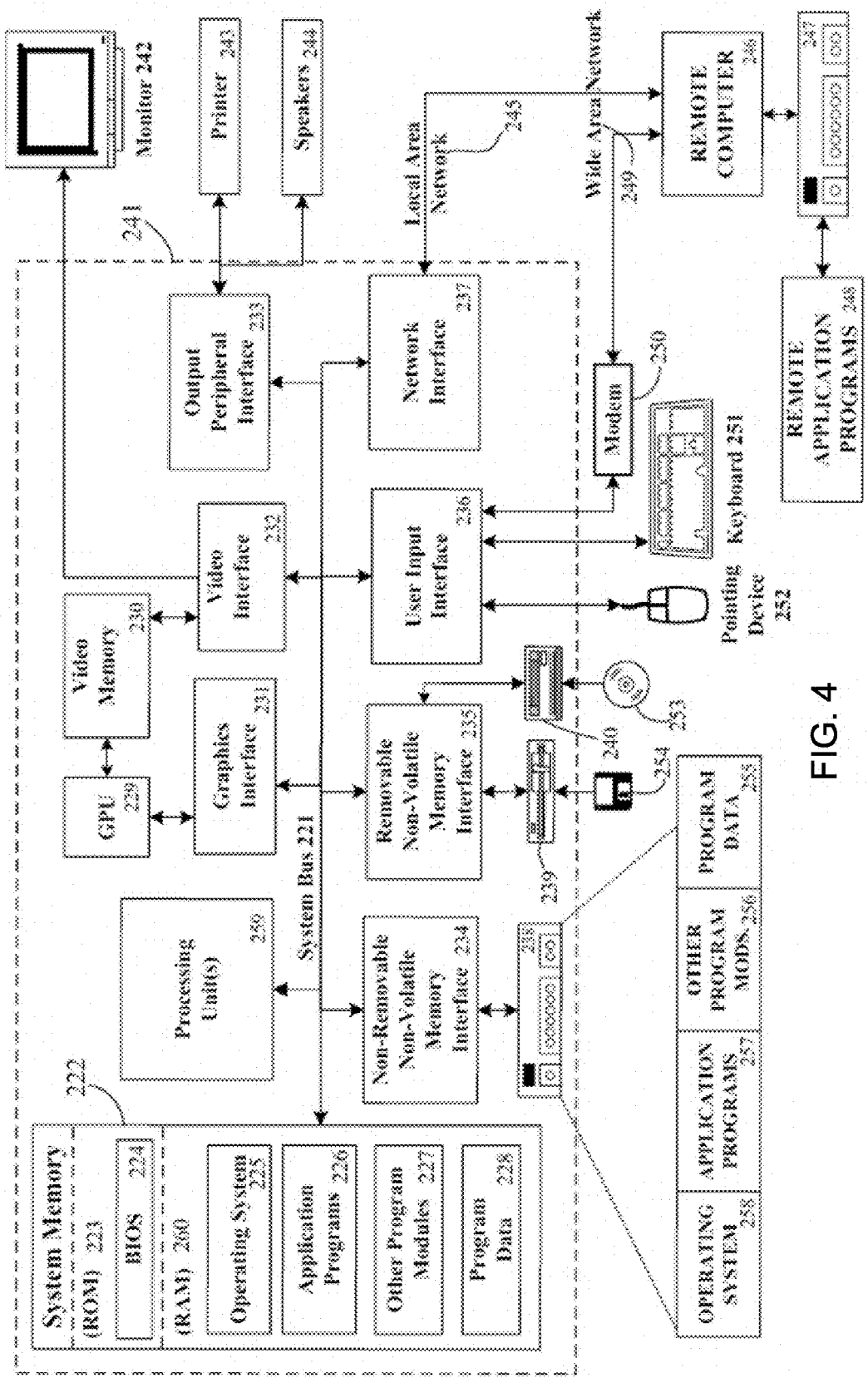
FIG. 4 illustrates another example embodiment of a computing environment that may be used to detect one or more gestures in a target recognition, analysis, and tracking system.

FIG. 4 illustrates another example embodiment of a computing environment 220 that may be the computing environment 12 shown in FIGS. 1 and 2 used to detect one or more gestures in a target recognition, analysis, and tracking system. Further, the exemplary computing environment may be used for altering a view perspective on an audiovisual device such as, for example, audiovisual device 16 shown in FIG. 1, based on one or more detected gestures. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 27, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
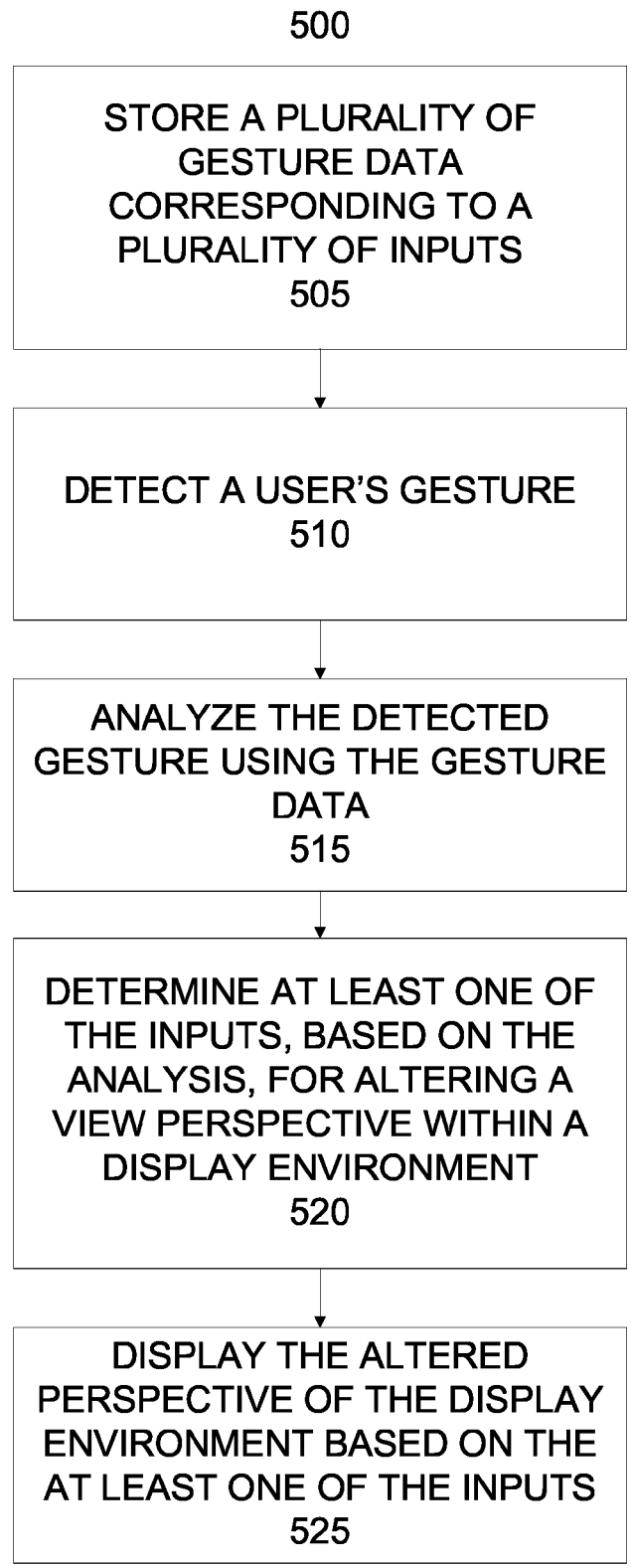
FIG. 5 depicts a flow diagram of an example method for altering a view perspective within a display environment based on a gesture made by a user.

FIG. 5 depicts a flow diagram of an example method 500 for altering a view perspective within a display environment based on a gesture made by the user 18. The example method 500 may be implemented using, for example, the capture device 20 and/or computing environment 12 of the system 10 described with respect to FIGS. 1-4. In one embodiment, the view perspective may be displayed on a display device such as, for example, the audiovisual device 16.

According to an example embodiment, gesture data corresponding to different inputs to a game or other application may be stored by computing environment 12 of the system 10 at 505. For example, the computing environment 12 may store gesture modeling data that may be used to compare against a user's gestures. The gesture data may include a collection of gesture filters, each comprising information concerning a gesture that may be performed by the user's skeletal model (as the user moves). The gesture data may contain certain aspects used for comparison to aspects of a user's movement to determine whether the user is making a particular gesture intended as input into a game or other application.

According to an example embodiment, a process may take place to determine if a target is a human when a target enters a capture device scene. If it is determined that a target is a human, movement of the target may be captured over a period of time. The capture device 20 may detect gesture information at 510. The detected gesture or motion of the user 18 may be analyzed using the stored gesture data at 515. For example, the computing environment may compare one or more aspects of the detected gesture to the stored gesture data for determining whether the detected gesture should be considered an input corresponding to one of the stored gesture data. For example, the computing environment may compare a user's foot movement to determine whether the movement should be considered to be a walking gesture.

Based on the analysis at 515, the computing environment 12 may determine at least one of the inputs that correspond to the gesture data for altering a view perspective within a display environment at 520. In this example, if the movement is considered a walking gesture, the movement can cause the view perspective within a display environment to move forward. At 525, the altered view perspective may be displayed via display such as, for example, the audiovisual device 16.

According to one embodiment, the user may be scanned periodically during a session. These scans may be used to generate a movement model of a user, where the model may be a skeletal movement model, a mesh human movement model, or any suitable representation thereof. This movement model may include specific data about gestures made by the user. This data can be compared to the stored gesture data for determining whether a gesture should be considered an input for altering a view perspective.

In an example embodiment, as described above, the movement of the user 18 described above with respect to FIG. 1 may be tracked. The view perspective displayed via the audiovisual display 16 can be altered as the user 18 makes suitable gestures recognized by the capture device 20 and computing environment 12. The recognized user gestures may serve as real-time inputs to an electronic role-playing game or application for moving a player in a 3D virtual environment. In one example, the inputs may move an on-screen character, avatar, or first-person character within a real environment captured by video equipment and displayed to the user.

In an example embodiment, a user may be able to navigate, interact, and alter a view perspective within a 3D virtual environment or other environment by making one or more gestures. Certain actions may be input into an application implementing the environment by detection one or more of the user's gestures. Exemplary input actions for controlling a user's avatar include walk forward, walk backward, rotate left to any desired facing, rotate right to any desired facing, run forward, strafe left, strafe right, arm movement, leg movement, and avatar interaction with object, such as with the avatar's hands and/or arms.

A walking motion may be detected when the user moves his or her legs up and down. Table 1 below provides exemplary user gestures for resulting in a corresponding input action.

TABLE 1

| Input Action | Gesture |
| --- | --- |
| Stop | To cause a stop input action, a user may stand still by not moving their feet or rotating their body or shoulders. In this example, the user's arms are free for 1-to-1 motion with game play character motion. |
| Walk Forward | To cause a walk forward input action, a user may step in place. A casual step in place walk will yield a normal walk pace in game. The rate of the walk forward movement may be based on the rate at which the user moves his or her feet. |
| Turn Left/Right Full Body | To cause a turn input action, a user rotates his or her entire body to the left or right. While the user's body rotation is within some threshold range (e.g., between 30 and 90 degrees from normal), their avatar may rotate at a constant speed in the same direction. This rotation may be continuous. The user may stop rotation by facing their body directly at the screen. The rate of the rotation movement may be based on the rate at which the user rotates. |
| Turn Left/Right & Walk | To cause a turn and walk input action at the same time, the user may walk in place just like walking forward in combination with the full body turning gesture. |
| Walk Backwards | To cause a walking backwards input action, a user steps in place but take one real step backwards. To move forward again, players must take one real step forward back to their original standing position. Walking backwards may only make the avatar or character walk backwards. This action does not turn the character around or rotate the camera around in any way. |
| Turn Left/Right Upper Body | To cause an upper body turn movement, the user may twist his or her torso and shoulders to the left or right. The same rotation settings and behaviors as a full body turn apply to this method, and both methods may run concurrently (as opposed to toggling between them-the player can just do whichever feels better to them). |
| Run Forward | To cause a run forward input action, a user may step in place but at a faster pace than a normal walk cycle. As the player increases his pace, the avatar's pace increases up to a maximum of twice the normal walk speed. Note that the ratio of player's speed to avatar's speed may be different than 1:1. |
| Strafing Left/Right Lean | Another technique for causing strafing may be for the user to lean to the left or right with his or her upper body. |
| Strafing Left/Right Walk | Another technique for causing strafing may be for the user to walk in place and take a full step to the side right or left while still performing the stepping action. |
| Feet Together | To cause the avatar to stay in position, the user may stand with his or her feet together. |

A directional stepping motion may utilize all the same actions and behaviors as the above-described walking motion, but instead of using the walking in place action to establish movement. To move forward, a user places one foot forward to initiate and maintain forward and/or backward motion. Table 2 below provides exemplary user gestures for resulting in a corresponding input action.

TABLE 2

| Input Action | Gesture |
| --- | --- |
| Stop | To cause a stop input action, a user's feet are positioned together side-by-side with no full body rotation or shoulder rotation. |
| Walk Forward | To cause a walk forward input action, a user places his or her left or right foot forward to indicate a walking intent. |
| Turn Left/Right & Walk Full Body | To cause an input action for turning and walking at the same time, a user takes a forward step that is positioned to the left or right of a forward (center positioned) step. Essentially, the player pivots on his or her rear foot to cause this input action. |
| Walk Backwards | To cause a walk backwards input action, a user places his or her left or right foot back a step to indicate the walk backwards action. |
| Turn Left/Right Upper Body | To cause a turn input action, a user rotates his or her torso and shoulders to the left/right. While the player's torso rotation is within some threshold range (ex: between 30 and 90 degrees from normal), the user's avatar rotates at a constant speed in the same direction. This rotation may be continuous, and the user stops rotating by squaring his or her shoulders directly at the screen. |
| Run Forward | To cause a run forward input action, a user steps forward from their original position one full step to the walk position and then leans forward with his or her upper body to signify a run action. |

TABLE 2-continued

| Input Action | Gesture |
| --- | --- |
| Strafe Left/Right Step | To cause a strafe step input action, a user takes his or her left or right foot and steps it out to the side and lean their full body weight onto that stepped out foot. The user's opposite foot can stay in its original position or slide over to the strafing direction the player is moving. |
| Turn Left/Right & Walk Upper Body | To cause this input action, a user turns left/right with just the upper body, takes a step forward, and also rotates his or her upper torso to the left or right. |
| Strafe Left/Right Lean | To cause this input action, the user may lean to the left/right with the upper body to initiate strafing. As long as the player is leaning, the character on screen will continue to strafe. |

Table 3 below provides exemplary predetermined avatar animation descriptions for input actions. These predetermined avatar animations may be preprogrammed movements of the avatar that are enacted when a user makes defined gestures.

TABLE 3

| Input Action | Description of Predetermined Avatar Animation |
| --- | --- |
| Stop or Idle | The avatar's shoulders and body all face forward with both feet together slightly apart in an "at ease" pose. There are no side stances or attack ready stances in this animation. |
| Walk Forwards | The avatar's body should be facing forward while walking. |
| Run | The avatar's body should be facing forward while running. |
| Walk Backwards | The avatars body faces forward with feet stepping backwards. |
| Strafe Left/Right | The avatar faces forward while legs step over and across to walk sideways. |
| Jump in Place | This animation involves a simple jump up in air from an idle pose. |
| Jump Forward | This animation involves a forward momentum jump from a run or walk. |
| Crouch | The crouch movement may just involve the upper body, so the lower body movement may be blended to maintain walk and run animations. |
| Stop from Run | A quick stop animation that halts movement of the avatar from run to stop. |
| Turn in Place Left/Right Walk and Turn Left/Right Run and Turn Left/Right | These three animations may be avatar rotations controlled via program code. |

In an example embodiment, predetermined avatar animations may be shown in combination with sounds. For example, when an avatar is caused to walk, light footsteps sounds may be played. In another example, when an avatar is caused to run, heavy footsteps sounds may be played. In another example, when an avatar is caused to strafe, scraping or sliding footstep sounds may be played. In another example, when an avatar is caused to bump into an object, a bumping sound may be played. In another example, when an avatar causes an object to fall or collide with another object, a heavy bumping sound may be played.

Figure 6:
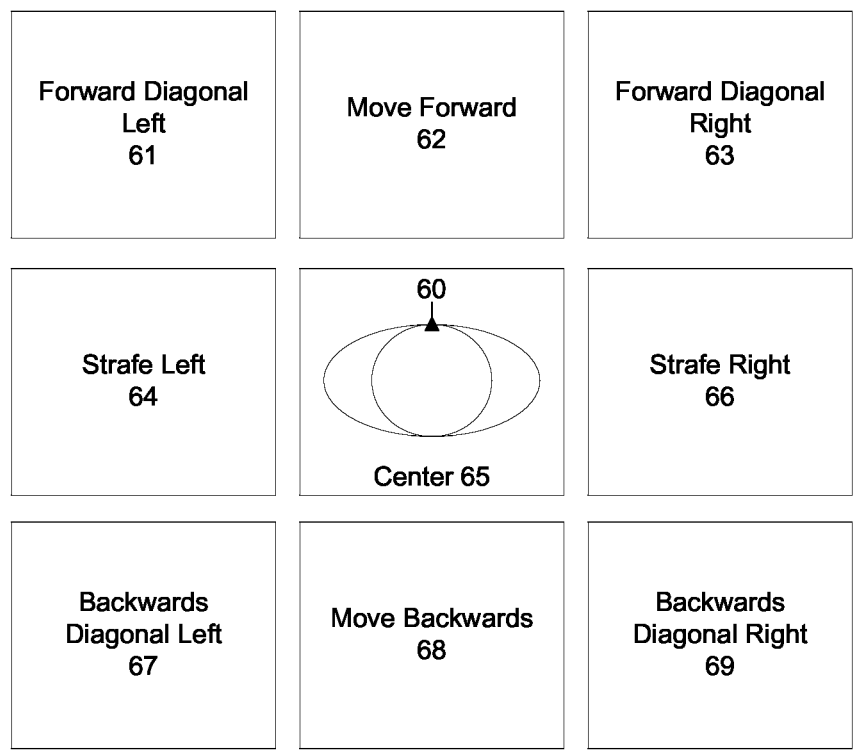
FIG. 6 depicts a top diagram of a play space divided into sectors within which a user may move to cause an input action.

In an example embodiment, a user may make action inputs by positioning his or her body entirely within a new sector or area of a play space. A play space may be divided into different sectors within which the user may move to cause an input action. FIG. 6 depicts a top diagram of a play space divided into nine (9) sectors within which the user may move to cause an input action. Referring to FIG. 6, a user 60 may move within the following areas: area 61 to input a forward, diagonal left movement; area 62 to input a forward movement; area 63 to input a forward, diagonal right movement; area 64 to input a strafe left movement; area 65 to input a move to a center position; area 66 to input a strafe right movement; area 67 to input a backwards, diagonal left movement; area 68 to input a backwards movement; and area 69 to input a backwards, diagonal right movement. These movements may cause inputs that would be similar to depressing direction buttons on a joystick controller. Within any of these positions, a user may rotate his or her shoulders to the right or left to turn an avatar or game character's body in the same direction on a display environment. Further, with these position and body rotation inputs, a user may strafe and turn at the same time to circle strafe within a 3D virtual environment.

In an example embodiment, a center position, such as at center area 65 in FIG. 6, stays fixed for an entire application session such as, for example, a game play session. In this example, each time a user moves outside of area 65, the user must return to area 65 to stop the user's avatar motion. A floor area of the play space may be marked to indicate area 65 so that the user knows where to return to stop the avatar's movement. In an example, a user may desire to move an avatar forward a distance and then stop. Such control may be accomplished by the user moving to area 62 for causing the avatar to move forward while the user is at area 62. After the user decides the avatar has moved forward far enough, the user can step back to center area 65 to stop the avatar's forward movement.

In an example embodiment, the system may recognize that the user desires to stop the avatar's movement even if the user does not fully return to the center area 65 from one of the other areas. For example, the system may recognize that the user makes a step in the direction of the center area 65 and/or that the user is positioned almost entirely within the center area 65. In one or both of these cases, the control input may be to stop the avatar's current action. Additionally, after such recognition by the system, the new position of the user may be considered the center area 65 with the position of the other areas being similarly redefined with respect to the center area 65.

A user may make one or more predefined gestures for redefining the position of the center area 65 within a play space. For example, the user may position his or her feet side-by-side to define the center area 65 as being at the current position of the user. The other areas would also be relocated with respect to the newly defined center area. The system may be configured to recognize the predefined gesture for defining the position of the center area, and configured to redefined the positions of the center area and other areas when the gesture is recognized. The gesture may be recognized at the beginning of game play or during game play.

A jump motion may be detected when the user moves in one or more different ways. In an example of a recognized jump action input, a user may jump in place with his or her feet leaving the floor. In another example, a jump action input may be recognized when a user quickly stands up on his or her toes followed by moving back to being flat-footed. In another example, a jump action input may be recognized when a user quickly drops downward by bending his or her knees quickly and then standing back up straight. In this example, this movement may be considered a prepare-for-jump action that initiates a full jump for the game character or avatar. Any of these movements may be recognized and similarly serve as an input for controlling an avatar or a view perspective within a display environment.

A crouch motion may be detected when the user makes a crouching movement. For example, a user may bend his or her knees and arch his or her back while leaning slightly forward to cause a crouch input action. This movement may be recognized and similarly serve as an input for controlling an avatar or a view perspective within a display environment.

Any of the jump and crouch actions may be performed in combination with any other motion gesture described herein. For example, a user may run and jump forward or back in combination, strafe left or right and jump in combination, run and crouch in combination, or strafe and crouch in combination. Any of these movements may be recognized and similarly serve as an input for controlling an avatar or a view perspective within a display environment.

Figure 7:
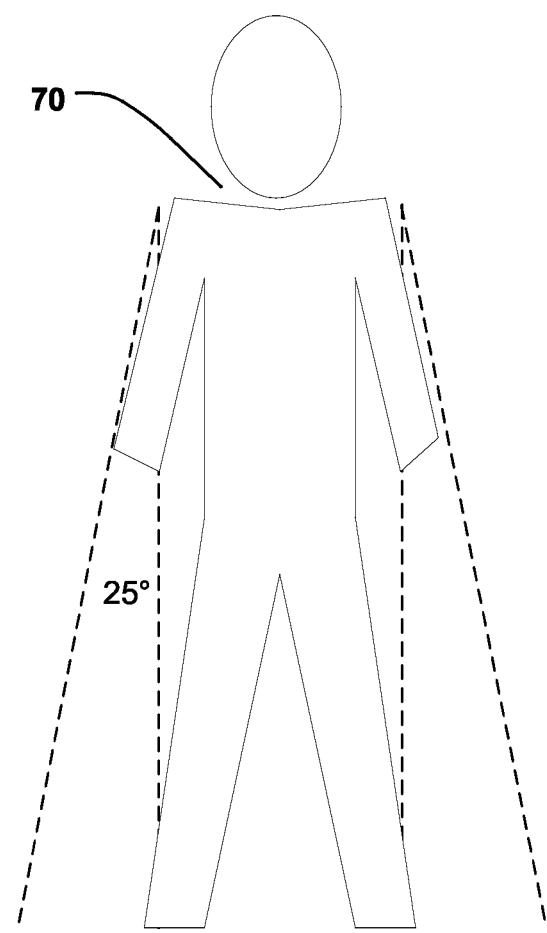
FIG. 7 illustrates a user positioned in a normal game play position.

According to an example embodiment, movements of a user from the waist up (e.g., head, arms, and torso) are mimicked nearly fully or 1:1 by the user's avatar. An exception to mimicking the user nearly fully or 1:1 is during a predetermined avatar animation. During predetermined animations, the user's upper body movement may be mimicked unless the user's arms are at rest or in a normal walking motion, in which case a predetermined animation for the avatar may take priority. FIG. 7 illustrates a user 70 positioned in a normal game play position. A normal game play position may be defined as the forearm-bicep angle being between 165° and 180°, and the arms forming a cone flaring downward at a 2° angle from the shoulders. The arms may be positioned anywhere within the cone defined by the dashed lines shown in FIG. 7.

In an example embodiment, predetermined avatar animations may take precedence over exactly mimicking the movement of a user. For example, if a "walk in place" or "run in place" gesture filter returns TRUE (that is, the game interprets the return value as walk or run, respectively), a walk or run animation for the avatar may be displayed. Further in this example, otherwise if the player triggers a movement animation by stepping in a direction, a predetermined movement animation for the avatar is displayed until the player stops the triggering movement. Otherwise, in this example, the movement of the avatar mimics the movement of the user. Thus, predetermined animations may typically take precedence over mimicking the movement of a user.

Referring back to FIG. 3, in one embodiment, upon receiving an image of a user, the image may be down-sampled to a lower processing resolution such that the image may be more easily used and/or more quickly processed with less computing overhead. Additionally, one or more high-variance and/or noisy values may be removed and/or smoothed from the image; portions of missing and/or removed image information may be filled in and/or reconstructed; and/or any other suitable processing may be performed on the received image information such that the information is useable for determining a gesture of the user as described above.

In an example embodiment, the system 10 may be used for detecting the gestures of more than one user simultaneously. In one example, the gestures of multiple users can be used for altering the view perspectives of display environments displayed on a corresponding number of portions of an audiovisual device, such as, for example, audiovisual device 16.

Figure 8:
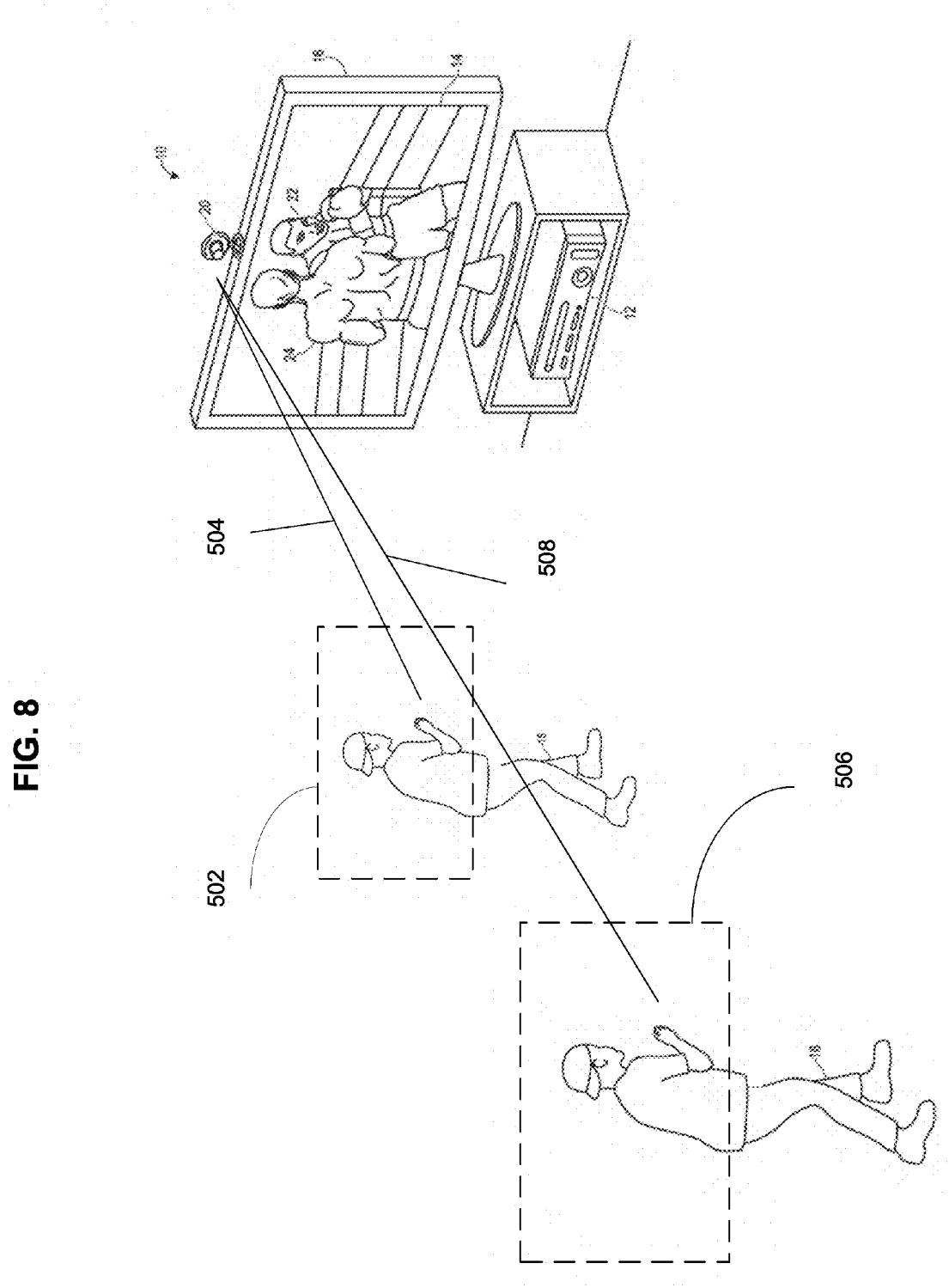
FIG. 8 illustrates two users positioned before a capture device for controlling the movements of two avatars.

FIG. 8 illustrates two users positioned before a capture device for controlling the movements of two avatars. According to one embodiment, the audiovisual device 16 may display avatars 22 and 24 within one or more virtual environments displayed on audiovisual device 16. Users 18 and 21 may make gestures for moving avatars 22 and 24, respectively. For example, users 18 and 21 may make walking motions for moving avatars 22 and 24, respectively, forward within their respective virtual environment. Users 18 and 21 may also make other gestures described herein for moving their respective avatars in accordance with the descriptions provided herein. In addition, users 18 and 21 may make gestures for altering a view perspective within the displayed virtual environment as described herein.

In an example embodiment, user movements may be partially or fully tracked for partially or fully controlling movements of the user's avatar. In an example, the system may not utilize every user movement for controlling the user's avatar. Such fidelity may be distracting to a user in some applications. The fidelity of a gesture filter may be adjusted, as needed, on a component-by-component basis in a user's skeletal model or other model. In an example, a user's arms may not be tracked to enable them to be free for operating a controller, such as a game play controller. In another example, a portion of a user's body, such as, for example, the left side of a user's body, may be exactly mimicked by the avatar, while movements of the right side of the user's body may be tracked for only "sweeping" gestures, or to reflect no control at all in the avatar. Sensitivity may be based on a distance of a user's body part from a normal position, speed of motion, and/or the like.

In another example embodiment, the system 10 may correct for drift of a target within a physical area. For example, during play, the user may move or drift from a central area. To correct for drift, the user may make one or more gestures for redefining a central position for the user. For example, the user may stand with his or her feet together for redefining the user's current position as the central position. Thus, in this way, the system can be indifferent to the user's position in a playspace, because the user may re-center his or her position when he or she notices that his or her position has drifted.

In another example embodiment, an avatar can mimic a user's movements in real-time. A gesture filter may, for example, recognize the user's gesture, and cause the avatar to mimic the gesture using a predetermined animation of the gesture. For example, if a user makes a throwing motion, an avatar's arm can be moved to mimic the user's throwing motion utilizing a predetermined throwing motion. In addition, a result of the throwing motion may be predetermined.

For example, an object held by the avatar may be thrown by the avatar in real-time response to the user's throwing motion.

In another example embodiment, an avatar may transition between a state where the avatar is controlled by user gesture and a state where the avatar is not controlled by user gesture. For example, a user's body may make gestures for moving between the states. For example, avatar-control by user gesture may be enabled when a user's foot and knee are raised to certain heights, such as in preparation for a stomp movement. In any other user position or movement in this example, the avatar is not controlled by user movement, other than, for example, by control of a joystick. When the user makes a movement to enable gesture-based control, the avatar may move to mimic the user's body position and movement.

In another example embodiment, a user may place his or her feet together to cause the avatar to stay in position. As a result, the control input may result in the avatar remaining in the same position within the virtual world, such that the next view perspective is only altered by other inputs. The next view perspective may be the same or altered based on other user control inputs or application inputs.

In yet another example embodiment, a user may make one or more gestures, as described herein, for altering a virtual viewport of a display environment. For example, a user's gesture may be used as an input for moving a camera view (virtual viewport). For example, the user may jump in place, and as a result, the camera view within the display environment may correspondingly move upwards. In another example, the user may move to the left or right, and as a result, the camera view within the display environment may correspondingly move to the left or right. In an embodiment, movement of one or more appendages of the user may be tracked, and the camera view within the display environment may move in a corresponding direction.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or processes disclosed herein, as well as equivalents thereof.

What is claimed:

1. A method for processing a gesture input for controlling an avatar movement on a display, the method comprising:

based at least upon determining a gesture indicative of a desire to define a central position of a user, defining, by a processor, a central area of a physical area, defining a first region of the physical area, and defining a second region of the physical area, the first region and the second region each defined with respect to a location on a floor in the central area, the central area, the first region and the second region each being three-dimensional and discrete from each other;

receiving, by the processor, first image data representing the user located in the first region, and determining, by the processor, from the first image data that the user has performed a gesture within the first region with a first portion of the user's body;

receiving, by the processor, second image data representing the user located in the second region, and determining, by the processor, from the second image data that the user has performed the gesture within the second region with the first portion of the user's body;

receiving, by the processor, third image data representing the user located in the first region, and determining, by the processor, from the third image data that the user has performed the gesture within the first region with a second portion of the user's body;

processing, by the processor, the gesture in a first manner to display and control a movement of the avatar on the display based at least on the gesture having been recognized to have been performed within the first region with a first portion of the user's body;

processing, by the processor, the gesture in a second manner to display and control a movement of the avatar on the display based at least on the gesture having been recognized to have been performed within the second region with the first portion of the user's body;

processing, by the processor, the gesture in a third manner to display and control a movement of the avatar on the display based at least on the gesture having been recognized to have been performed within the first region with the second portion of the user's body;

subsequently after processing the gesture to display and control the movement of the avatar in the first manner, in the second manner, or in the third manner on the display, receiving, by the processor, fourth image data representing the user located at least in part in the central area, and determining from the fourth image data that the user is located at least in part in the central area;

determining, by the processor, based on the fourth image data, that the user has moved at least in part to the central area from the first region or the second region;

halting, by the processor, the corresponding movement of the avatar in the first manner, in the second manner, or in the third manner on the display based at least on determining that the user has moved at least in part to the central area from the first region or the second region after performing the gesture in the first region or the second region; and based at least upon determining, by the processor, a gesture indicative of a desire to redefine the central position of the user, redefining the central area of the physical area, redefining the first region of the physical area, and redefining the second region of the physical area.

2. The method of claim 1, wherein receiving, by the processor, first image data representing the user located in the first region, and determining, by the processor, from the first image data that the user has performed the gesture within the first region with the first portion of the user's body comprises:

filtering conditions comprising an angular distance or a linear distance from a skeletal bone position or a skeletal joint position of a model generated from the first image data.

3. The method of claim 1, wherein receiving, by the processor, first image data representing the user located in the first region, and determining, by the processor, from the first image data that the user has performed the gesture within the first region with the first portion of the user's body comprises:

filtering conditions comprising a velocity or an acceleration of a skeletal bone or a skeletal joint of a model generated from the first image data.

4. The method of claim 1, wherein receiving, by the processor, first image data representing the user located in the first region, and determining, by the processor, from the first image data that the user has performed the gesture within the first region with the first portion of the user's body comprises:
detecting, by the processor, that the first image data is indicative of a forward movement, a backward movement, a turn movement, a duck movement, a crouch movement, a swim movement, a flying movement, a zoom movement, a strafe movement, or a circle movement.

5. The method of claim 1, further comprising:
altering, by the processor, a view perspective within a display environment in response to receiving the first image data indicative of the user being located within the first region.

6. The method of claim 1, further comprising:
determining, by the processor, that a region of the physical area is the first region in response to receiving, by the processor, image data indicative of the user identifying a current location of the user as corresponding to the first region.

7. The method of claim 1, further comprising:
in response to receiving, by the processor, image data indicative of the user having redefined a region of the physical area as corresponding to not altering a view perspective within a display environment,
determining, by the processor, that the first region no longer corresponds to altering the view perspective within the display environment, and
determining, by the processor, that a third region corresponds to altering the view perspective within the display environment.

8. The method of claim 1, wherein the third manner of processing comprises determining, by the processor, that the gesture does not comprise a tracked gesture and disregarding the gesture.

9. The method of claim 8, wherein the tracked gesture comprises a sweeping gesture.

10. The method of claim 1, wherein the first portion of the user's body is a left side of a user's body and the second portion of the user's body is a right side of the user's body.

11. The method of claim 1, further comprising:
receiving, by the processor, fifth image data representing the user located in the first region or the second region, and determining, by the processor, from the fifth image data that the user has performed a different gesture within the first region or the second region, the different gesture comprising a movement or a position of a third portion of the user's body; and
processing, by the processor, the different gesture in a fourth manner based at least on the different gesture having been recognized to have been performed within the first region and comprises the movement or the position of the third portion of the user's body.

12. The method of claim 11, wherein the first portion of the user's body comprises the user's leg, the second portion of the user's body comprises the user's opposite leg, and the third portion of the user's body comprises the user's arms.

13. A system for processing a gesture input for controlling an avatar movement on a display, comprising:

a processor; and
a memory communicatively coupled to the processor when the system is operational, the memory bearing processor-executable instructions that, when executed on the processor, cause the system at least to:
based at least upon determining a gesture indicative of a desire to define a central position of a user, define a central area of a physical area, define a first region of the physical area, and define a second region of the physical area, the first region and the second region each defined with respect to a location on a floor in the central area, the central area, the first region and the second region each being three-dimensional and discrete from each other;
receive first image data representing the user located in the first region, and determine from the first image data that the user has performed a gesture within the first region with a first portion of the user's body;
receive second image data representing the user located in the second region, and determine from the second image data that the user has performed the gesture within the second region with the first portion of the user's body;
receive third image data representing the user located in the first region, and determine from the third image data that the user has performed the gesture within the first region with a second portion of the user's body;
process the gesture in a first manner to display and control a movement of the avatar on the display based at least on the gesture having been recognized to have been performed within the first region with the first portion of the user's body;
process the gesture in a second manner to display and control a movement of the avatar on the display based at least on the gesture having been recognized to have been performed within the second region with the first portion of the user's body;
process the gesture in a third manner to display and control a movement of the avatar on the display based at least on the gesture having been recognized to have been performed within the first region with the second portion of the user's body;
subsequently after processing the gesture to display and control the movement of the avatar in the first manner, in the second manner, or in the third manner on the display,
receive fourth image data representing the user located at least in part in the central area, and determine from the fourth image data that the user is located at least in part in the central area;
determine, based on the fourth image data, the user has moved at least in part to the central area from the first region or the second region;
halt the corresponding movement of the avatar in the first manner, in the second manner, or in the third manner on the display based at least on determining that the user has moved at least in part to the central area from the first region or the second region after performing the gesture in the first region or the second region; and
based at least upon determining a gesture indicative of a desire to redefine the central position of the user, redefine the central area of the physical area, redefining the first region of the physical area, and redefining the second region of the physical area.

14. The system of claim 13, wherein the processor-executable instructions that cause the system at least to process the recognized gesture in a first manner further cause the system at least to:
  detect that the first image data is indicative of a forward movement, a backward movement, a turn movement, a duck movement, a crouch movement, a swim movement, a flying movement, a zoom movement, a strafe movement, or a circle movement.

15. The system of claim 13, wherein the processor-executable instructions further cause the system at least to:
  in response to determining that the user has performed the gesture, a view perspective within a display environment and display the altered view perspective of the display environment, the display environment comprising a three-dimensional virtual environment or a displayed real environment.

16. A computer-readable device that is not a signal, bearing computer-executable instructions that, when executed on a computer, cause the computer to perform operations for processing a gesture input for controlling an avatar movement on a display comprising:
  based at least upon determining a gesture indicative of a desire to define a central position of a user, defining a central area of a physical area, defining a first region of the physical area, and defining a second region of the physical area, the first region and the second region each defined with respect to a location on a floor in the central area, the central area, the first region and the second region each being three-dimensional and discrete from each other;
  receiving first image data representing the user located in the first region, and determining from the first image data that the user has performed a gesture within the first region with a first portion of the user's body;
  receiving second image data representing the user located in the second region, and determining from the second image data that the user has performed the gesture within the second region with the first portion of the user's body;
  receiving third image data representing the user located in the first region, and determining from the third image data that the user has performed the gesture within the first region with a second portion of the user's body;
  processing the gesture in a first manner to display and control a movement of the avatar on the display based at least on the gesture having been recognized to have been performed within the first region with the first portion of the user's body;
  processing the gesture in a second manner to display and control a movement of the avatar on the display based at least on the gesture having been recognized to have been performed within the second region with the first portion of the user's body;
  processing the gesture in a third manner to display and control a movement of the avatar on the display based at least on the gesture having been recognized to have been performed within the first region with the second portion of the user's body;
  subsequently after processing the gesture to display and control the movement of the avatar in the first manner, in the second manner, or in the third manner on the display,
  receiving fourth image data representing the user located at least in part in the central area, and determining from the fourth image data that the user is located at least in part in the central area;
  determining, based on the fourth image data, the user has moved at least in part to the central area from the first region or the second region;
  halting the corresponding movement of the avatar in the first manner, in the second manner, or in the third manner on the display based at least on determining that the user has moved at least in part to the central area from the first region or the second region after performing the gesture in the first region or the second region; and
  based at least upon determining a gesture indicative of a desire to redefine the central position of the user, redefining the central area of the physical area, redefining the first region of the physical area, and redefining the second region of the physical area.

17. The computer-readable device of claim 16, wherein processing the gesture in a first manner comprises detecting that the first image data is indicative of a forward movement, a backward movement, a turn movement, a duck movement, a crouch movement, a swim movement, a flying movement, a zoom movement, a strafe movement, or a circle movement.

18. The computer-readable device of claim 16, further bearing computer-executable instructions that, when executed on the computer, cause the computer to perform operations comprising:
  in response to determining that the user has performed the gesture, altering a view perspective within a display environment and displaying the altered view perspective of the display environment, the display environment comprising a three-dimensional virtual environment or a displayed real environment.

* * * * *